3,728,148
METHOD FOR THE PRODUCTION OF ELECTRICAL PRESSURE SENSITIVE INSULATING TAPES
Hanns Pietsch and Julius Curts, Hamburg, Germany, assignors to Beiersdorf Aktiengesellschaft, Hamburg, Germany
Filed Dec. 17, 1970, Ser. No. 99,250
Claims priority, application Germany, Dec. 24, 1969, P 19 64 747.3
Int. Cl. B44d 1/50; C09j 7/02
U.S. Cl. 117—93.31    11 Claims

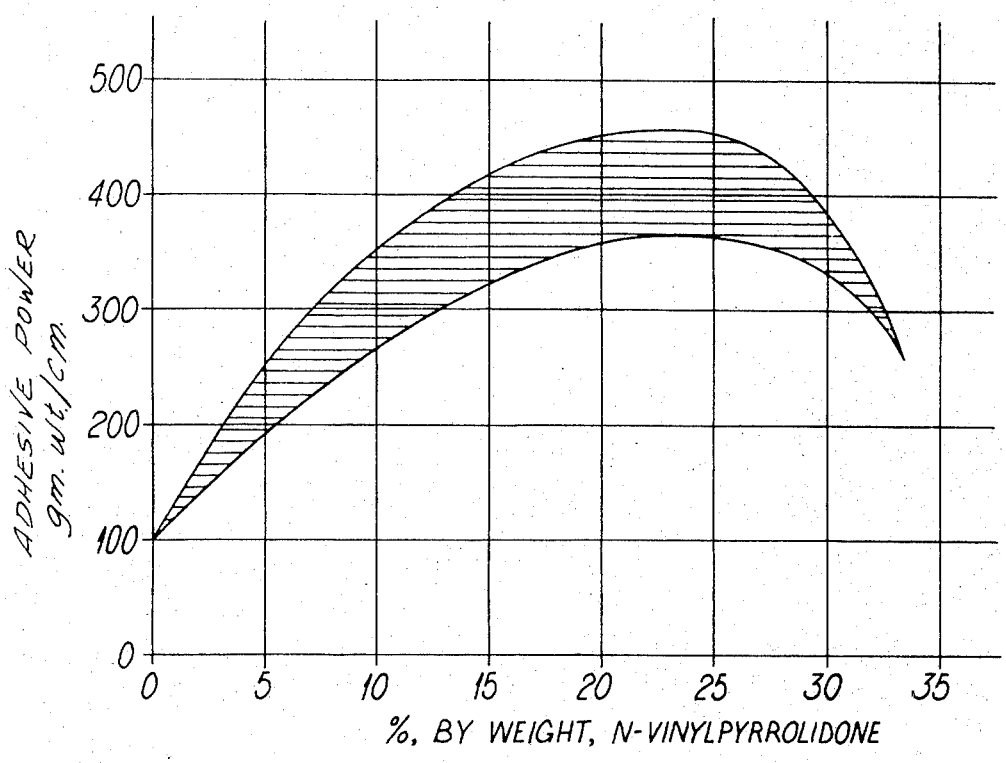

ABSTRACT OF THE DISCLOSURE

A solution of a copolymer is applied to a base material. The copolymer comprises 65 to 90% by weight, based on total monomer weight, of at least one ester of acrylic acid with a straight or branched chain primary or secondary alcohol having 4–12 carbon atoms, 10 to 30% by weight, based on total monomer weight, of at least one N-vinyl lactam having the general formula

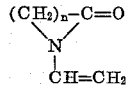

wherein $n$ is 3, 4 or 5 and 0–20% by weight, based on total monomer weight, of at least one modifying monomer copolymerizable with the above recited monomers. The resultant coating is dried. An electrical insulating tape comprising a pressure sensitive self-adhesive coating on a carrier material is thereby obtained. The tape has improved adhesion, cohesion and gripping capacity.

---

The invention relates to a method for the production of electrical insulating tapes which are coated with a pressure-sensitive self-adhesive coating of a copolymer of an acrylic ester and an N-vinyl lactam.

Copolymers of esters of acrylic acid or methacrylic acid with N-vinyl lactams, particularly with N-vinyl pyrrolidone, are used in industry for many purposes. They are used as lubricant additives, gasoline additives and as dispersing and suspending agents for pigments in oil based systems such as for example varnishes and paints.

It is known that properties of acrylate-self-adhesive compounds such as adhesion, cohesion and gripping capacity, can be influenced by copolymerization with certain monomers. As comonomers for the production of such acrylic ester copolymers, 3 to 12% by weight of acrylic acid, acrylic amide or acrylic nitrile or the corresponding methacrylic compounds have been suggested. Polymerization of N-tert. butyl acrylic amide in quantities of 15 to 35% by weight is also known. These monomers improve the cohesion and partly also the adhesion of the self-adhesive compounds. However, these so-called "hardening" monomers impair the gripping capacity. Additionally, they render the self-adhesive compounds unsuitable as an adhesive coat for electrolytic tape. This is attributable to the fact that these monomers have reactive groups which cause electrolytic corrosion of the conductor.

It has now been found that self-adhesive compounds which are acrylic ester based and which contain a polymerized portion of about 10 to 30% by weight of N/vinyl lactam(s) are particularly suitable for electrical insulating tapes. These polymers do not contain reactive groups which cause electrolytic corrosion under the influence of an electric field. Moreover, the N-vinyl lactam(s), when employed in the above-indicated range, improve all self-adhesive properties of the acrylate adhesive compounds, viz. adhesion, cohesion and gripping capacity.

Copolymers of acrylic esters with 4% by weight of acrylic amide or 10% by weight of acrylic acid exhibit gelling during the polymerization. This leads to technical difficulties in processing. In contrast thereto, with the method of the present invention, this disadvantageous gelling does not occur.

The method of the present invention results in the production of an electrical insulating tape, which consists of a flexible carrier material having a pressure-sensitive self-adhesive acrylic ester based coat applied thereon. The method is characterized in that a copolymer of (a) 65 to 90% by weight, based on the total monomer weight of an ester(s) of acrylic acid and a straight-chain or branched chain primary or secondary alcohol(s) having 4 to 12 carbon atoms;

(b) 10 to 30% by weight, based on the total monomer weight of a N/vinyl lactam(s) having the general formula

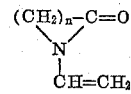

wherein $n$ is 3, 4 or 5;

(c) 0 to 20% by weight, based on the total monomer weight, of a modifying monomer(s) which is copolymerizable with the monomers of the above groups (a) and (b), is produced according to known polymerization methods. A solution of the copolymer is then applied to the carrier material and dried at elevated temperature.

The monomer(s) of group (a) represent so-called "plasticizing" acrylic esters. In the practical realization of the present invention, 75 to 85% by weight of n-butyl acrylate, a mixture of n-butyl acrylate and 2-ethylhexyl acrylate, or 2-ethyl-hexyl acrylate, based on the total monomer weight, is preferably used.

The monomer(s) of group (b) include for example N-vinyl pyrrolidone, N-vinyl piperidone and N-vinyl caprolactam. 10 to 20% by weight of N-vinyl pyrrolidone, based on the total monomer weight, is preferred.

If the content of N-vinyl lactam(s) is below 10% by weight, increased adhesion and improved cohesion and grip will not be realized. On the other hand, if it is over 30% by weight, the polymers will increasingly assume a varnish like appearance. Moreover, gripping capacity and adhesion will then diminish. This is shown very clearly in the figure representing the dependence of the adhesion of the copolymers on the N-vinyl pyrrolidone content.

The monomer(s) of group (c) serve as modifying additives. They permit varying of the self-adhesive properties in finer graduations. If low esters (having 1 to 3 carbon atoms in the alcohol portion) of acrylic, methacrylic, maleic, fumaric, or itaconic acid or vinyl acetate are used, depending on the amount used the polymer can be made somewhat harder. On the other hand, a softer adhesive compound can be obtained by polymerizing higher esters (4 to 12 carbon atoms in the alcohol portion) of fumaric, maleic or itaconic acid and vinyl esters of C–6 to C–12 carboxylic acids.

Of the monomers of groups (a), (b) and (c), one can select one representative monomer from each group. Alternatively, in place of the one monomer selected as the representative of each group, a mixture of monomers can be employed.

The self-adhesive compounds according to the invention are normally not crosslinked. It may, however, be advantageous to crosslink them for certain uses. Crosslinkage of the self-adhesive compounds is always indicated when the adhesive tape has to meet special requirements with respect to cohesion and stability to solvents. The majority of conventional crosslinking systems impair properties relating to insulation of electrical conductors. Therefore, only a limited number of conventional crosslinking systems is suitable. No acids, amines or acid inorganic salts should be present in the adhesive compound. They cause electrolytic corrosion of the conductor. Organic peroxides, such as dibenzoyl peroxide, are suitable. They should be added in amounts of 0.5 to 5% by weight based on the solids content. The crosslinkage is effected by a brief heat treatment at 120 to 150° C. on the carrier. The crosslinkage may advantageously be produced by irradiation at room temperature with beta- or gamma rays at a dose of about 1 to 5 Mrad.

Peroxide- and radiation induced crosslinkage do not in any way impair the good electrolytic corrosion behavior of the adhesive compounds. Moreover, little to no effect on the gripping capacity and adhesion is obtained.

The copolymers may be produced according to known methods, for example, solvent polymerization with peroxide or azo-initiators, such as dibenzoyl peroxide or azo-isobutyronitrile, in organic solvents. Preferably mixtures of benzine (boiling limits 60 to 95° C.), acetone and isopropyl alcohol are used as solvents. The monomer concentrations should be from 50 to 70% by weight.

The initiator concentration should be from 0.05 to 2.0% by weight, based on the solids content.

The molecular size of the polymers produced in the examples which follow are indicated by their Fikentscher K-value (Cellulose-Chemie, 13, 58 (1932)). The K-value ranges from 50 to 100, preferably 60 to 90, and is determined by measuring the viscosity of 1% solutions of the copolymers at 20° C. in toluene.

The copolymer may be applied on the respective carrier material, using any of the known methods. Preferably it is applied in solution form and, if necessary, with crosslinking additives. After drying and, if required, crosslinking, adhesive compounds are produced. It is also possible to add a small amount of a neutral plasticizer, such as a phthalate or a neutral viscidifying resin, such as a ketone resin, in small amounts in order to modify certain properties. A prerequisite for the use of these additives is that they are completely neutral in electrolytic respect.

Suitable carrier materials for the self-adhesive electrical insulating tapes include, for example, foils of plastics such as polyvinyl chloride, polyethylene glycol terephthalate or polycarbonate; fabrics, foams, asbestos and glass fiber fabrics. The carrier can have an adhesive-repellent back coating and/or be provided with an adhesion-producing intermediate layer.

The following examples are offered only to describe the invention more fully and not for the purpose of limiting same.

It should be noted that the reaction apparatus used in the production of the copolymers and the method employed to test the self-adhesive properties were the same for all examples.

The self-adhesive copolymers, according to the invention, were produced in stainless steel or glass vessels which were provided with a stirrer, a reflux condenser, a gas inlet pipe and an inside thermometer. The copolymers were applied, according to known methods, on carrier materials, dried, and, if necessary, crosslinked. After a storage period of at least 24 hours, the self-adhesive properties, in particular the coating thickness, the adhesion, the "holding power" (a measure of the shearing strength) and the electrolytic corrosion were tested according to VDE test 0340.

The coating thickness was determined by weighing equal size pieces of the uncoated and coated carrier material.

To measure the adhesive power, 10 to 20 mm. wide strips of the test material were pasted under light pressure on ground and degreased plates of stainless steel, and a loaded roll (2 kg./cm. tape width, velocity 10 m./min.) was rolled five times back and forth over them. The test strip was removed from the steel plate in a tensile testing machine. The results obtained were indicated in grams weight per centimeter of tape width (takeoff angle 180°, velocity 30 cm./min.).

To measure the holding power, 2.54 cm. (1 inch) of a strip of test material having a width of 10–20 mm. and an overall length of about 15 cm. was pasted on a ground and degreased plate of stainless steel. The pasted portion of the strip was pressed on to the plate by moving a 2 kg. roll once back and forth over it. The free end was then loaded in vertical suspension with a weight of 400 g./cm. tape width. The test was carried out at 50 and 100° C. The time until the strip fell off was indicated in minutes.

EXAMPLE 1

| | Parts by weight |
|---|---|
| Acrylic butyl ester (70%) | 105 |
| Fumaric-di-2-ethyl hexyl ester (20%) | 30 |
| N-vinyl-2-pyrrolidone (10%) | 15 |
| Acetone | 50 |
| Benzine (boiling range 60–95° C.) | 50 | were saturated with nitrogen, heated to a reaction temperature of about 60° C., and then mixed with 0.3 part by weight of dibenzoyl peroxide (a 75% aqueous solution). The polymerization was effected for 22 hours at 60° C. In the course of the polymerization the mixture was gradually diluted with solvent as the viscosity increased:

1st dilution: 25.5 parts by weight benzine (60–95° C. boiling range) after about 3 hours reaction time
2nd dilution: 83.5 parts by weight benzine (60–95° C. boiling range) after about 5 hours reaction time
3rd dilution: 83.5 parts by weight benzine (60–95° C. boiling range) after about 16 hours reaction time
4th dilution: 39 parts by weight isopropanol after about 21 hours reaction time.

The polymer solution had a solids content of about 40% and a K-value of 70. The polymer yield was about 97%.

To test the self-adhesive properties, a polyethylene glycol terephthalate foil of 25 micron thickness was coated with this polymer solution, then dried for 5 minutes at 120° C. A self-adhesive coating was obtained having the following properties:

| | |
|---|---|
| Coating thickness g./m.² | 16 |
| Adhesive power gm. wt./cm. | 325 |
| Holding power at 50° (min.) | 4 |
| Holding power at 100° (min.) | 2 |

The electrolytic corrosion according to VDE 0340 was A–1.0.

EXAMPLE 2

| | Parts by weight |
|---|---|
| Acrylic butyl ester (75%) | 112.5 |
| N-vinyl caprolactam (10%) | 15 |
| Methacrylic methyl ester (15%) | 22.5 |
| Acetone | 50 |
| Benzine (boiling range 60–95° C.) | 50 | were polymerized with 0.3 part by weight azo-isobutyronitrile as described in Example 1.

1st dilution: 27.5 parts by weight benzine (boiling range 60–95° C.) about 3½ hours after start of reaction
2nd dilution: 83.5 parts by weight benzine (boiling range 60–95° C.) about 5 hours after start of reaction
3rd dilution: 30 parts by weight acetone about 16 hours after start of reaction
4th dilution: 50 parts by weight isopropanol about 21 hours after start of reaction.

The polymer solution had a solids content of 42% and a K-value of 78.1. The polymer yield was 98%. This polymer was applied on a polyethylene glycol terephthalate foil of 25 micron thickness and dried for 5 minutes at 120° C. The resultant coating had the following properties:

| | | |
|---|---|---|
| Coating thickness | g./m.² | 22.1 |
| Adhesive power | gm. wt./cm. | 380 |
| Holding power at 50° C. | min. | >262 |
| Holding power at 100° C. | min. | 13 |

EXAMPLE 3

| | Parts by weight |
|---|---|
| 2-ethyl hexyl acylate (75%) | 112.5 |
| N-vinyl 2-pyrrolidone (10%) | 15 |
| Methacrylic methyl ester (15%) | 22.5 |
| Benzine (boiling range 60–95° C.) | 50 |
| Acetone | 50 | were polymerized at about 60° C. for 24 hours with 0.3 parts by weight azoisobutyronitrile as described in the preceding examples. By dilution, about a 35% polymer solution was obtained. The polymer solution had a K-value of 76. The polymer yield was 98%. This polymer was applied on various carriers and dried for 5 minutes at 70° C.

| | a | b | c |
|---|---|---|---|
| Coating thickness (g./m.²) | 24.2 | 22.0 | 20.0 |
| Adhesive power (gm. wt./cm.) | 365 | 550 | 300 |
| Holding power at 50° C (min.) | 34 | 46 | 13 |
| Holding power at 100° C (min.) | 3 | 4 | |

NOTE.—Carriers: a=Polyethylene glycol terephthalate foil; b=Cellulose acetate butyrate foil; c=Soft PVC foil.

One sample strip each of these adhesive foils was subjected to the VDE test 0340. The electrolytic corrosion was found to be A–1.0, hence no corrosion.

EXAMPLE 4

In order to obtain better cohesion, the polymer from Example 3 was applied on a polyethylene glycol terephthalate foil (25 micron thickness) and this coated foil was subjected to gamma radiation of 2.5 mrad. As a result, cohesion was improved (longer holding power values were obtained) without any impairment of the adhesion.

| | | |
|---|---|---|
| Coating thickness | g./m.² | 25 |
| Adhesive power | gm. wt./cm. | 360 |
| Holding power at 50° C. | min. | >180 |
| Holding power at 100° C. | min. | 27 |

Electrolytic corrosion according to VDE 0340: A–1.0.

EXAMPLE 5

This example serves to show the crosslinkage of a polymer by the action of organic peroxides. The polymer produced in Example 3 was mixed with 3% by weight dibenzoyl peroxide (about 80% peroxide content, water-moist). It was then applied on a polyethylene glycol terephthalate foil. The coated foil was then dried for 5 minutes at 120° C., whereby cross linking occurred.

The following values were measured:

| | | |
|---|---|---|
| Coating thickness | g./m.² | 23.2 |
| Adhesive power | gm. wt./cm. | 345 |
| Holding power at 50° C. | min. | >1700 |
| Holding power at 100° C. | min. | 25 |

Electrolytic corrosion according to VDE 0340: A–1.0. A–1.0.

EXAMPLE 6

A further improvement of the holding power values, particularly at higher temperatures, is obtained by the combination of a peroxide addition with rapid drying and subsequent irradiation. A sample according to Example 5 was produced, but with the difference that the drying was effected in a drying duct of 6 m. length which was subdivided into 6 heating regions. The temperature in the various sectors was 60°, 80°, 120°, 120°, 120°, 120° C. The velocity was 10 m./min. Rolls were made from this adhesive web. A part of the rolls was subjected to a gamma radiation of 2.5 mrad.

| | Not radiated | Irradiated |
|---|---|---|
| Coating thickness (g./m.²) | 20 | 20 |
| Adhesive power (gm. wt./cm.) | 350 | 350 |
| Holding power at 50° C. (min.) | 28 | >600 |
| Holding power at 100° C. (min.) | 6 | >600 |
| Electrolytic corrosion (VDE 0340) | A–1.1 | |
| Breakdown voltage (VDE 0303), kv. | 6.3 | |
| Dielectric loss factor tg delta (800 Hz.) | 23.7·10⁻³ | |
| Dielectric constant Er | 2.8 | |
| Specific current flow resistance (VDE 0303), ohm. cm. | 8.9·10¹⁴ | |

EXAMPLES 7, 8, 9

| | 7 | | 8 | | 9 | |
|---|---|---|---|---|---|---|
| | Parts by weight | Percent | Parts by weight | Percent | Parts by weight | Percent |
| 2-ethylhexyl acrylate | 112.5 | 75 | 120 | 80 | 112.5 | 75 |
| N-vinyl-2-pyrrolidone | 22.5 | 15 | 30 | 20 | 37.5 | 25 |
| Methacrylic methyl ester | 15 | 10 | | | | |
| Benzine (boiling range 60–95° C.) | 50 | | 50 | | 50 | |
| Acetone | 50 | | 50 | | 50 | | were polymerized, as described in the preceding examples, with 0.3 part by weight of azo-isobutyronitrile at about 60° C. for about 24 hours. The polymer solution so obtained was applied on a 25 micron thick foil of polyethylene glycol terephthalate and dried. The characteristic values as well as the self-adhesive properties are complied in the following table:

| | 7 | 8 | 9 |
|---|---|---|---|
| Polymer content (percent) | 36.1 | 29.2 | 29.1 |
| K-value | 80.5 | 86.6 | 89.8 |
| Polymer yield (percent) | 99 | 100 | 99 |
| Coating thickness (g./m.²) | 25.6 | 28 | 24 |
| Adhesive power (gm. wt./cm.) | 405 | 380 | 390 |
| Holding power at 50° C. (min.) | 63 | 10 | 35 |
| Holding power at 100° C. (min.) | 4 | 4 | 3 |

Electrolytic corrosion for Examples 7, 8 and 9 according to VDE 0340: A–1.0.

EXAMPLE 10

| | Parts by weight |
|---|---|
| N-vinyl-2-pyrrolidone (15%) | 22.5 |
| Methacrylic methyl ester (10%) | 15 |
| Acrylic-dodecyl ester (75%) | 112.5 |
| Benzine (boiling range 60–95° C.) | 80 |
| Acetone | 20 | were polymerized with 0.45 part by weight azo-isobutyronitrile for about 24 hours at 60° C. and diluted during the polymerization with benzine (boiling range 60–95° C.) and acetone as required. A spreadable adhesive compound was obtained. Solids content: 54.5%; K-value (in toluene): 65.5.

This polymer was mixed with 3% dibenzoyl peroxide (about 80% water-moist), then applied in a coating thickness of 30 g./m.² on a 40 micron thick PVC soft foil and dried in a known manner. Subsequently the adhesive foil was subjected to a gamma-radiation of 2.5 mrad. The self-adhesive tape so obtained showed excellent adhesive properties. The electrolytic corrosion according to VDE 0340 was again A–1.0.

What is claimed is:

1. A method for the production of a pressure sensitive, electrically insulating adhesive tape comprising the steps of applying to a carrier material a solution of a copolymer of
   (A) 65 to 90% by weight, based on total monomer weight, of at least one ester of unsubstituted acrylic acid with a straight or branched chain unsubstituted primary or secondary alcohol having 4 to 12 carbon atoms;
   (B) 10 to 30% by weight, based on total monomer weight of at least one unsubstituted N-vinyl lactam having the general formula

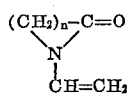

wherein $n$ is 3, 4 or 5;
   (C) 0 to 20% by weight, based on total monomer weight, of at least one modifying monomer which is copolymerizable with the monomers of the groups A and B, to produce a coating and then drying said coating.

2. The method according to claim 1, further including the step of heating said applied solution in the presence of 0.5 to 5% by weight of a peroxide compound, based on the solids content, to crosslink same.

3. The method according to claim 1, further including the step of subjecting said applied solution to beta or gamma ray irradiation at an absorbed dose of 1 to 5 mrad to crosslink same.

4. The method according to claim 1 wherein (A) is 75 to 85% by weight of n-butyl acrylate, 2-ethyl hexyl acrylate or a mixture thereof.

5. The method according to claim 1, wherein (B) is 10 to 20% by weight of N-vinyl pyrrolidone.

6. An electrical insulating tape comprising a carrier material having applied thereon a pressure sensitive self-adhesive layer comprising a compolymer of
   (A) 65 to 90% by weight, based on total monomer weight, of at least one ester of unsubstituted acrylic acid with a straight or branched chain unsubstituted primary or secondary alcohol having 4–12 carbon atoms and
   (B) 10 to 30% by weight, based on total monomer weight, of at least one unsubstituted N-vinyl lactam having the general formula

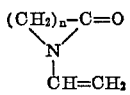

wherein $n$ is 3, 4 or 5.

7. The tape as described in claim 6, said adhesive layer further containing 0–20% by weight, based on total monomer weight, of at least one modifying monomer which is copolymerizable with the monomers of (A) and (B).

8. The tape as described in claim 6 wherein said modifying monomer is selected from the group consisting of vinyl acetate; an ester of acrylic acid, methacrylic acid, maleic acid, fumaric acid or itaconic acid with an alcohol having 1–3 carbon atoms, an ester of fumaric acid, maleic acid or itaconic acid with an alcohol having 4–12 carbon atoms; and a vinyl ester of a C–6 to C–12 carboxylic acid.

9. The tape as described in claim 6 wherein said carrier material is flexible and is plastic foil, fabric or foam.

10. The tape as described in claim 9 wherein said fabric is an asbestos fiber fabric or a glass fiber fabric and said plastic foil is of polyvinyl chloride, polyethylene glycol terephthalate or polycarbonate.

11. A method for the production of a pressure sensitive, electrically insulating adhesive tape comprising the steps of applying to a carrier material a solution of a copolymer of
   (A) 65 to 90% by weight, based on total monomer weight, of at least one ester of unsubstituted acrylic acid with a straight or branched chain unsubstituted primary or secondary alcohol having 4–12 carbon atoms and
   (B) 10 to 30% by weight, based on total monomer weight, of at least one unsubstituted N-vinyl lactam having the general formula

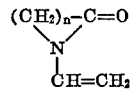

wherein $n$ is 3, 4 or 5.

References Cited

UNITED STATES PATENTS

| | | | |
|---|---|---|---|
| 3,397,192 | 8/1968 | Crosser et al. | 260—80.72 |
| 3,299,010 | 1/1967 | Samour | 260—86.1 N |
| 3,361,842 | 1/1968 | Applegath et al. | 204—159.22 |
| 2,335,454 | 11/1943 | Schuster et al. | 260—88.3 L |
| 3,417,054 | 12/1968 | Merijan et al. | 260—88.3 L |

FOREIGN PATENTS

| | | | |
|---|---|---|---|
| 645,611 | 7/1962 | Canada | 260—88.3 L |

WILLIAM D. MARTIN, Primary Examiner

J. H. NEWSOME, Assistant Examiner

U.S. Cl. X.R.

117—122 PA, 126 AB, 126 GR, 138.8 F, 138.8 UA, 145, 161 UN; 260—80.72, 86.1 N